United States Patent
Kanno (10) Patent No.: US 9,535,222 B2
(45) Date of Patent: Jan. 3, 2017

(54) OPTICAL CONNECTOR

(71) Applicant: FUJIKURA LTD., Tokyo (JP)

(72) Inventor: Shuhei Kanno, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/960,717

(22) Filed: Dec. 7, 2015

(65) Prior Publication Data

US 2016/0085036 A1   Mar. 24, 2016

Related U.S. Application Data

(63) Continuation of application No. 14/685,721, filed on Apr. 14, 2015.

(30) Foreign Application Priority Data

Apr. 14, 2014 (JP) ................................. 2014-082838
Apr. 14, 2014 (JP) ................................. 2014-082842
Apr. 15, 2014 (JP) ................................. 2014-083589

(51) Int. Cl.
  *G02B 6/36* (2006.01)
  *G02B 6/38* (2006.01)

(52) U.S. Cl.
  CPC ........... *G02B 6/3882* (2013.01); *G02B 6/3847* (2013.01); *G02B 6/3891* (2013.01); *G02B 6/3885* (2013.01); *G02B 6/3893* (2013.01)

(58) Field of Classification Search
  CPC .......................... G02B 6/3891; G02B 6/3882
  See application file for complete search history.

(56) References Cited

U.S. PATENT DOCUMENTS 4,339,165 A * 7/1982 Malsot ................. G02B 6/3816
                                                                439/139
6,206,579 B1   3/2001 Selfridge et al.
(Continued)

FOREIGN PATENT DOCUMENTS

EP      0128768 A2    12/1984
JP    2005-010726 A    1/2005
(Continued)

OTHER PUBLICATIONS

Communication dated Sep. 18, 2015 from the European Patent Office issued in corresponding application No. 15163181.9.
(Continued)

*Primary Examiner* — Rhonda Peace
(74) *Attorney, Agent, or Firm* — Sughrue Mion, PLLC (57) ABSTRACT

A plug-side optical connector, including: a plug-side coupling mechanism and a ferrule. The plug-side coupling mechanism is to be coupled to a coupling mechanism of another optical connector, the other optical connector being on receptacle side and being for being coupled with the plug-side optical connector. The plug-side coupling mechanism includes: a reference section to which the coupling mechanism of the other receptacle-side optical connector is to be hooked; and an inserted section that is to be inserted into a cylindrical main body of the coupling mechanism on the receptacle side. The ferrule is accommodated inside the inserted section. When a direction in which the optical connector is attached or detached is defined as a front-rear direction and a side of the receptacle-side optical connector is defined as front, a distance in the front-rear direction from the reference section to a front edge of the inserted section is 7.0 mm or more.

5 Claims, 11 Drawing Sheets

(56) References Cited

U.S. PATENT DOCUMENTS

| | | | |
|---|---|---|---|
| 6,250,818 B1 | 6/2001 | Loughlin et al. | |
| 7,341,381 B2* | 3/2008 | Shimoji | G02B 6/3893 385/60 |
| 7,785,019 B2 | 8/2010 | Lewallen et al. | |
| 8,757,894 B2* | 6/2014 | Katoh | G02B 6/3885 385/78 |
| 2006/0204178 A1 | 9/2006 | Theuerkorn et al. | |
| 2008/0050072 A1* | 2/2008 | Durrant | G02B 6/32 385/74 |
| 2008/0253717 A1* | 10/2008 | Cull | G02B 6/383 385/54 |
| 2009/0305542 A1* | 12/2009 | Masuzaki | H01R 13/625 439/335 |
| 2010/0043159 A1 | 2/2010 | Fujiwara | |
| 2010/0215322 A1* | 8/2010 | Matsumoto | G02B 6/3879 385/78 |
| 2011/0189876 A1* | 8/2011 | Schneider | G02B 6/3887 439/271 |
| 2011/0211792 A1 | 9/2011 | Koreeda et al. | |
| 2013/0209041 A1* | 8/2013 | Szilagyi | B29D 11/0075 385/78 |
| 2014/0079356 A1 | 3/2014 | Pepin et al. | |
| 2015/0293310 A1* | 10/2015 | Kanno | G02B 6/3891 385/78 |
| 2016/0085035 A1* | 3/2016 | Volker | G02B 6/3874 385/60 |
| 2016/0085036 A1* | 3/2016 | Kanno | G02B 6/3847 385/60 |

FOREIGN PATENT DOCUMENTS

| | | |
|---|---|---|
| JP | 2010-164997 A | 7/2010 |
| JP | 2011-112751 A | 6/2011 |
| JP | 2012-003157 A | 1/2012 |
| WO | 2007127213 A2 | 11/2007 |

OTHER PUBLICATIONS

Communication dated Apr. 7, 2016 issued by the United States Patent and Trademark Office in counterpart U.S. Appl. No. 14/685,721.

Communication dated Jul. 12, 2016, from the Canadian Patent Office in counterpart Canadian application No. 2,887,523.

Communication dated Jul. 14, 2016, from the European Patent Office in counterpart European application No. 16165221.9.

* cited by examiner

(SM OPTICAL FIBER)
FIG. 10A (MM OPTICAL FIBER)
FIG. 10B

OPTICAL CONNECTOR

CROSS-REFERENCE TO RELATED APPLICATIONS

The present application is a continuation application of U.S. Ser. No. 14/685,721, filed Apr. 14, 2015, which claims priority from Japanese Patent Application Nos. 2014-082842 and 2014-082838 filed on Apr. 14, 2014, and Japanese Patent Application No. 2014-083589 filed on Apr. 15, 2014, which are herein incorporated by reference.

BACKGROUND

Technical Field

The present invention relates to an optical connector.

Related Art

As optical connectors in which a ferrule is accommodated in such a manner that the ferrule can move rearward, an MPO connector (F12 type optical connector prescribed in JIS C5981), for example, has been known. When connecting optical connectors, a guide pin protruding from the end face of the ferrule of one optical connector is inserted into a guide hole of the ferrule of the other optical connector. And, while the ferrules being positioned, the end faces of the ferrules physically meet each other at a certain force. In this way, optical fibers are optically coupled.

As optical connectors including a ferrule, optical connectors, for example, described in Patent Literatures 1 to 3 have also been known.

CITATION LIST

Patent Literature

Patent Literature 1 U. S. Application Publication No. 2013/0209041
Patent Literature 2 U.S. Pat. No. 7,785,019
Patent Literature 3 U.S. Pat. No. 6,206,579

TECHNICAL PROBLEM

Since well-known optical connectors (e.g., an MPO connector) are not intended for frequent attaching/detaching, a coupling mechanism for coupling optical connectors to each other is, in some cases, composed of parts made of resin. However, if the coupling mechanism is composed of such resin parts, when the optical connector is repeatedly attached/detached, the coupling mechanism made of resin is worn, so that the durability of the optical connector deteriorates (the allowable number of attaching/detaching decreases).

As opposed thereto, it can be considered that employing a coupling mechanism made of metal improves the durability of the coupling mechanism. For example, if a coupling device used in electric connectors (e.g., a coupling device of a BNC connector) is employed, the coupling device is expected to withstand thousands times of attaching/detaching, based on the long-term experience of such a coupling device. But, whereas the durability of the coupling mechanism improves, the transmission loss of the optical connector increases and the durability of the optical connector deteriorates due to the wear around a guide hole of one ferrule, the wear being caused by a guide pin of the other ferrule.

SUMMARY

An advantage of some aspects of the present invention is to improve the durability of an optical connector.

An aspect of the invention to achieve the above advantage is a plug-side optical connector including: a plug-side coupling mechanism that is to be coupled to a coupling mechanism of another optical connector, the other receptacle-side optical connector being on receptacle side and being for being coupled with the plug-side optical connector, the plug-side coupling mechanism including a reference section to which the coupling mechanism of the other receptacle-side optical connector is to be hooked and an inserted section that is to be inserted into a cylindrical main body of the coupling mechanism on the receptacle side; and a ferrule that is accommodated inside the inserted section, wherein when a direction in which the optical connector is attached or detached is defined as a front-rear direction and a side of the receptacle-side optical connector is defined as front, a distance in the front-rear direction from the reference section to a front edge of the inserted section is 7.0 mm or more.

With such a plug-side optical connector, the allowable number of attaching/detaching increases dramatically, and the durability of the optical connector improves.

Other features of the present invention will become clear through the following description and the accompanying drawings.

Effects of the Invention

According to the invention, the durability of an optical connector can improve.

BRIEF DESCRIPTION OF THE DRAWINGS

FIGS. 1A and 1B are explanatory diagrams of an optical connector system.

DESCRIPTION OF EXEMPLARY EMBODIMENTS

At least the following matters will be made clear by the following description of the present specification and the accompanying drawings.

There is described a plug-side optical connector including: a plug-side coupling mechanism that is to be coupled to a coupling mechanism of another optical connector, the other optical connector being on receptacle side and being for being coupled with the plug-side optical connector, the plug-side coupling mechanism including a reference section to which the coupling mechanism of the other receptacle-side optical connector is to be hooked and an inserted section that is to be inserted into a cylindrical main body of the coupling mechanism on the receptacle side; and a ferrule that is accommodated inside the inserted section, wherein when a direction in which the optical connector is attached or detached is defined as a front-rear direction and a side of the receptacle-side optical connector is defined as front, a distance in the front-rear direction from the reference section to a front edge of the inserted section is 7.0 mm or more.

With such a plug-side optical connector, the allowable number of attaching/detaching increases dramatically, and the durability of the optical connector improves.

It is desirable that the distance in the front-rear direction from the reference section to the front edge of the inserted section is determined so that the main body on the receptacle side does not come into contact with an end face of the ferrule no matter how the plug-side optical connector is inclined with respect to the receptacle-side optical connector. This can prevent the end face of the ferrule from being damaged.

It is desirable that the ferrule is, while being pushed forward, accommodated in such a manner that the ferrule can move rearward, and that the coupling mechanism includes an anchor section to which a projection of the coupling mechanism on the receptacle side is to be hooked, and that the reference section is a front surface of the anchor section. A mechanical reference plane is thereby specified rigorously.

It is desirable that the plug-side coupling mechanism is a metal coupling device and that the plug-side optical connector further includes: a housing which is made of resin and which is accommodated by the coupling device while accommodating the ferrule in such a manner that the ferrule can move rearward; and a metal member which is affixed to the coupling device while holding the housing between the metal member and the coupling device. This makes it possible to improve the durability of the ferrule which is accommodated in an optical connector in such a manner that the ferrule can move rearward even if a metal coupling device is employed in the optical connector.

It is desirable that a difference between a Young's modulus of the housing and a Young's modulus of the ferrule is smaller than a difference between a Young's modulus of the coupling device and the Young's modulus of the ferrule. This improves the durability of the ferrule.

Embodiments

Before the description of the configuration of an optical connector (a plug-side optical connector) of the present embodiment, an outline of an optical connector system, which also includes a receptacle-side optical connector, will be described.

Outline of Optical Connector System

Figure 1A:
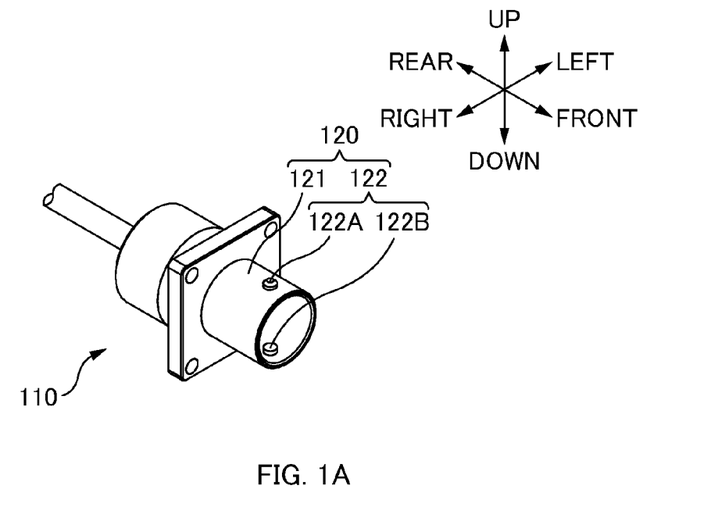
FIG. 1A is a perspective view of a receptacle-side optical connector 110.
Figure 1B:
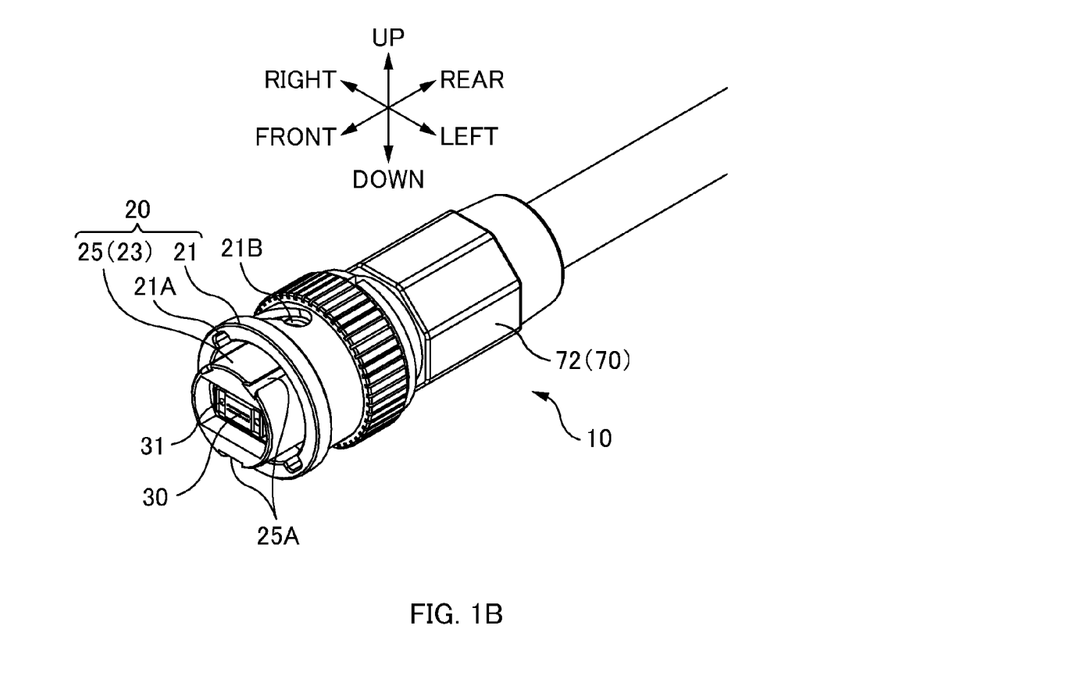
FIG. 1B is a perspective view of a plug-side optical connector 10.
Figure 2A:
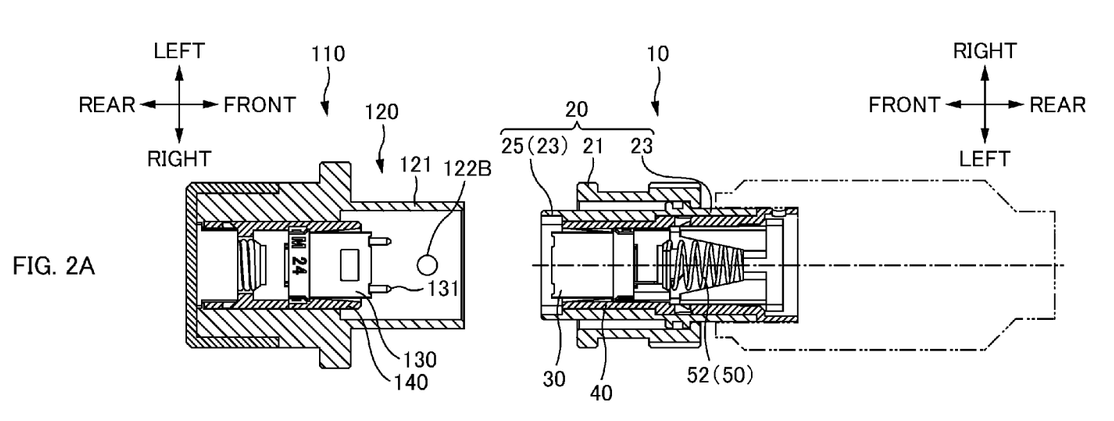
FIGS. 2A and 2B are cross-sectional views of optical connectors 10 and 110.
Figure 2B:
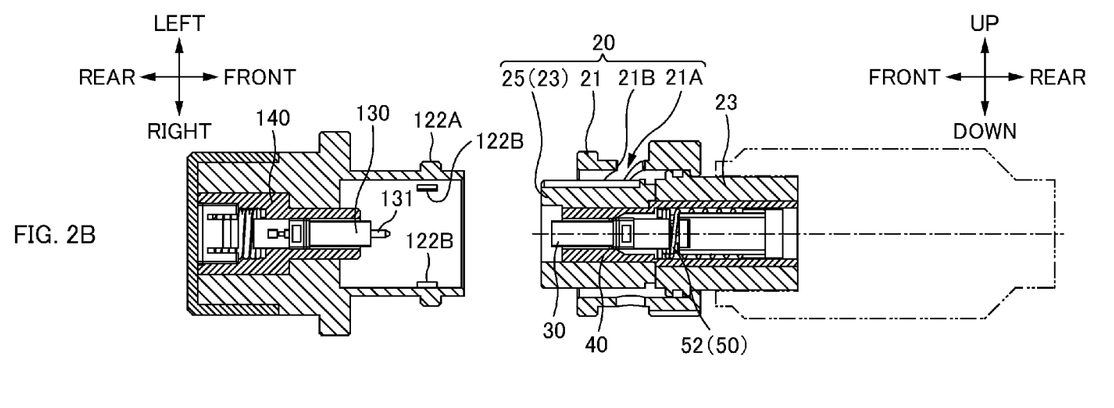

FIGS. 1A and 1B are explanatory diagrams of an optical connector system. FIG. 1A is a perspective view of a receptacle-side optical connector 110, and FIG. 1B is a perspective view of a plug-side optical connector 10. FIGS. 2A and 2B are cross-sectional views of optical connectors 10 and 110. As shown in FIGS. 2A and 2B, optical connector system includes: the receptacle-side optical connector 110; and the plug-side optical connector 10.

In the following description, the directions are defined as shown in the figures. That is, the "front-rear direction" is defined along a direction in which the connector is attached or detached: the side of the end face of each ferrule (the side closer to a mating optical connector) is defined as "front", and the opposite side as "rear". The "left-right direction" is defined along a direction in which the long sides of a rectangular end face of the ferrule extend: the right side when viewed from the rear toward the front is defined as "right", and the opposite side as "left". A direction perpendicular to the front-rear direction and the left-right direction is defined as the "up-down direction".

The receptacle-side optical connector 110 includes: a coupling device 120; a ferrule 130; and a housing 140. The plug-side optical connector 10, as in the receptacle-side one, includes: a coupling device 20; a ferrule 30; and a housing 40.

The coupling devices 20 and 120 are each a metal coupling section (also referred to as a coupling mechanism, or a connecting mechanism). The coupling devices 20 and 120 are for coupling the optical connectors 10 and 110 to each other, and a BNC type coupling device, which is used in electric coaxial connectors, is employed in these embodiments. The present invention is, however, not limited to the BNC type coupling device, and it is possible to use a screw style coupling device. There are screw style coupling devices, which are rotated by hand or by a spanner, etc., and any type of coupling devices may be employed. In addition, a slide-on style coupling device, which is easy to attach/detach, may be employed.

The receptacle-side coupling device 120 includes: a cylindrical main body 121; and a projection 122. Into the cylindrical main body 121, the inserted section 25 of a plug-side coupling device 20 is inserted. The projection 122 includes: an outer projection 122A which protrudes outwardly from the outer surface of the main body 121; and an inner projection 122B which protrudes inwardly from the inner surface of the main body 121.

The plug-side coupling device 20 includes: a rotation section 21; and an outer housing 23. The rotation section 21 is a cylindrical portion which is rotatable outside the outer housing 23 (the inserted section 25). In the rotation section 21, receiving sections 21A and an anchor section 21B are formed. The outer housing 23 is a metal housing which accommodates the housing 40, and has the inserted section 25 formed in the front side thereof. The inserted section 25 is a portion which is inserted into the receptacle-side main body 121. On the outer surface of the inserted section 25, grooves 25A are formed along the front-rear direction.

When the plug-side coupling device 20 is connected to the receptacle-side coupling device 120, the outer projections 122A on the receptacle side pass through the receiving sections 21A of the rotation section 21 while rotating the rotation section 21, and the outer projections 122A are anchored by the anchor section 21B. And, while mating the inner projections 122B placed on the receptacle side with grooves 25A placed on the plug side, the inserted section 25 placed on the plug side is inserted into the receptacle-side main body 121, and the plug-side optical connector 10 is thereby aligned to the receptacle-side optical connector 110.

The ferrules 30 and 130 are members which hold a plurality of optical fibers, and are MT type (Mechanically Transferable) optical connectors (F12 type optical connector prescribed in JIS C5981) in these embodiments. Guide pins 131 protrude from an end face of the receptacle-side ferrule 130. The tip of each guide pin 131 (the front end) is located on the rear side with respect to the front edge of the receptacle-side coupling device 120, and the receptacle-side ferrule 130 is located on the rear side with respect to the front edge of the receptacle-side coupling device 120. Also, the plug-side ferrule 30 is located on the rear side with respect to the front edge of the plug-side coupling device 20 (the inserted section 25).

The housing 140 is a member which accommodates the ferrule 130 in such a manner that the ferrule can move rearward and is accommodated by the coupling device 120. In the inner space of the housing 140, protrusions are formed. While the flange of the ferrule 130 engages the protrusions, the ferrule 130 is pushed forward by the reaction force of the coil spring of a floating mechanism.

By coupling the receptacle-side coupling device 120 and the plug-side coupling device 20 to each other, the receptacle-side optical connector 110 is connected to the plug-side optical connector 10. When coupling the plug-side coupling device 20 to the receptacle-side coupling device 120, the guide pins 131 protruding from the end face of one of the two ferrules (herein the receptacle-side ferrule 130) are inserted in the guide holes 31 of the other ferrule (herein the plug-side ferrule 30); the ferrules 30 and 130 are thereby positioned. Then, the end faces of the ferrules 30 and 130 meet to each other, and this makes the end faces of the optical fibers to physically meet to each other. Consequently, the optical fibers are optically connected. Since the end faces of the optical fibers meet to each other at a certain force, the ferrules 30 and 130, which are respectively accommodated by the housings 40 and 140, can move rearward with the floating mechanism.

Configuration of Plug-Side Optical Connector 10

Figure 3:
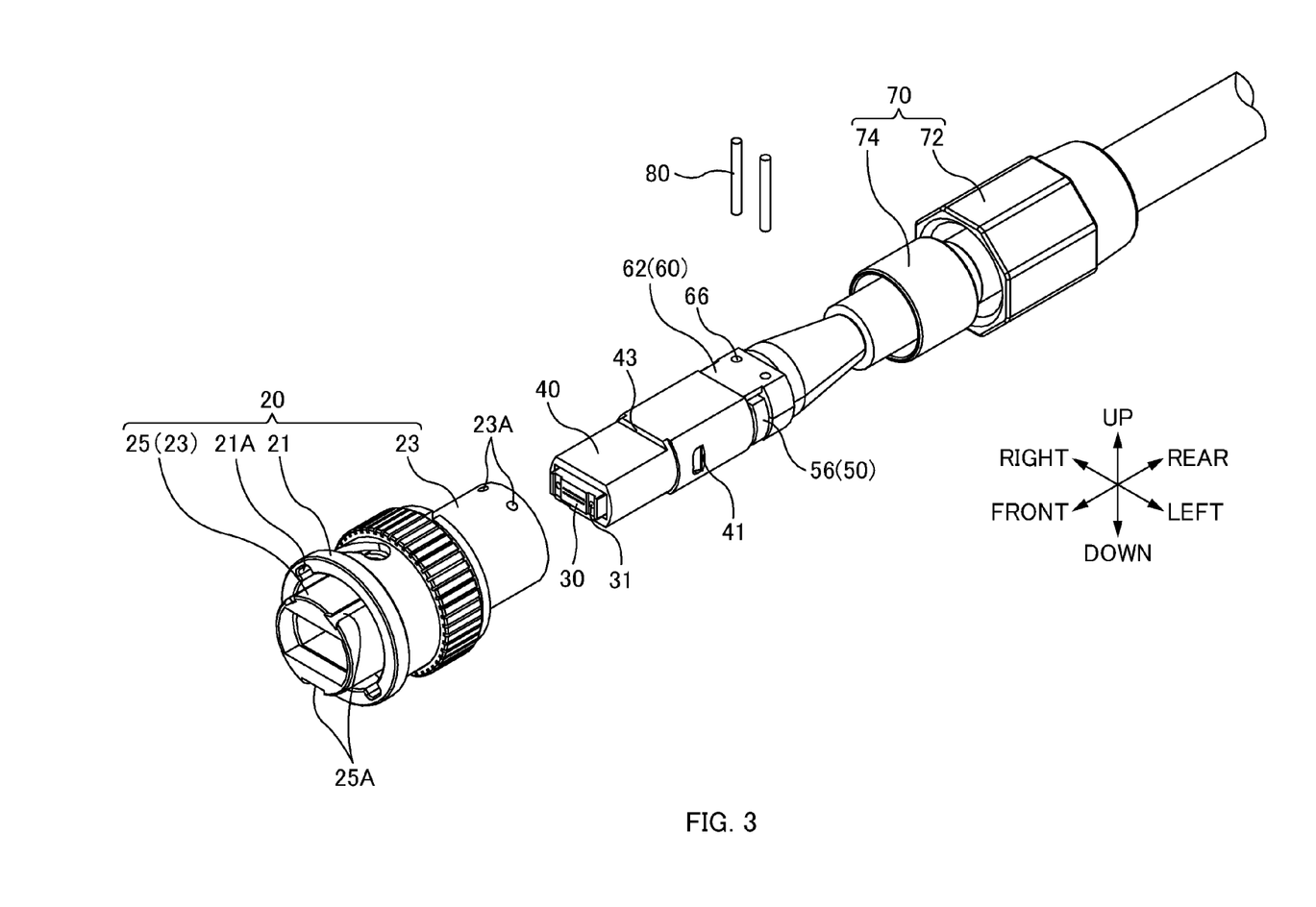
FIG. 3 is an exploded view of the plug-side optical connector 10.
Figure 4:
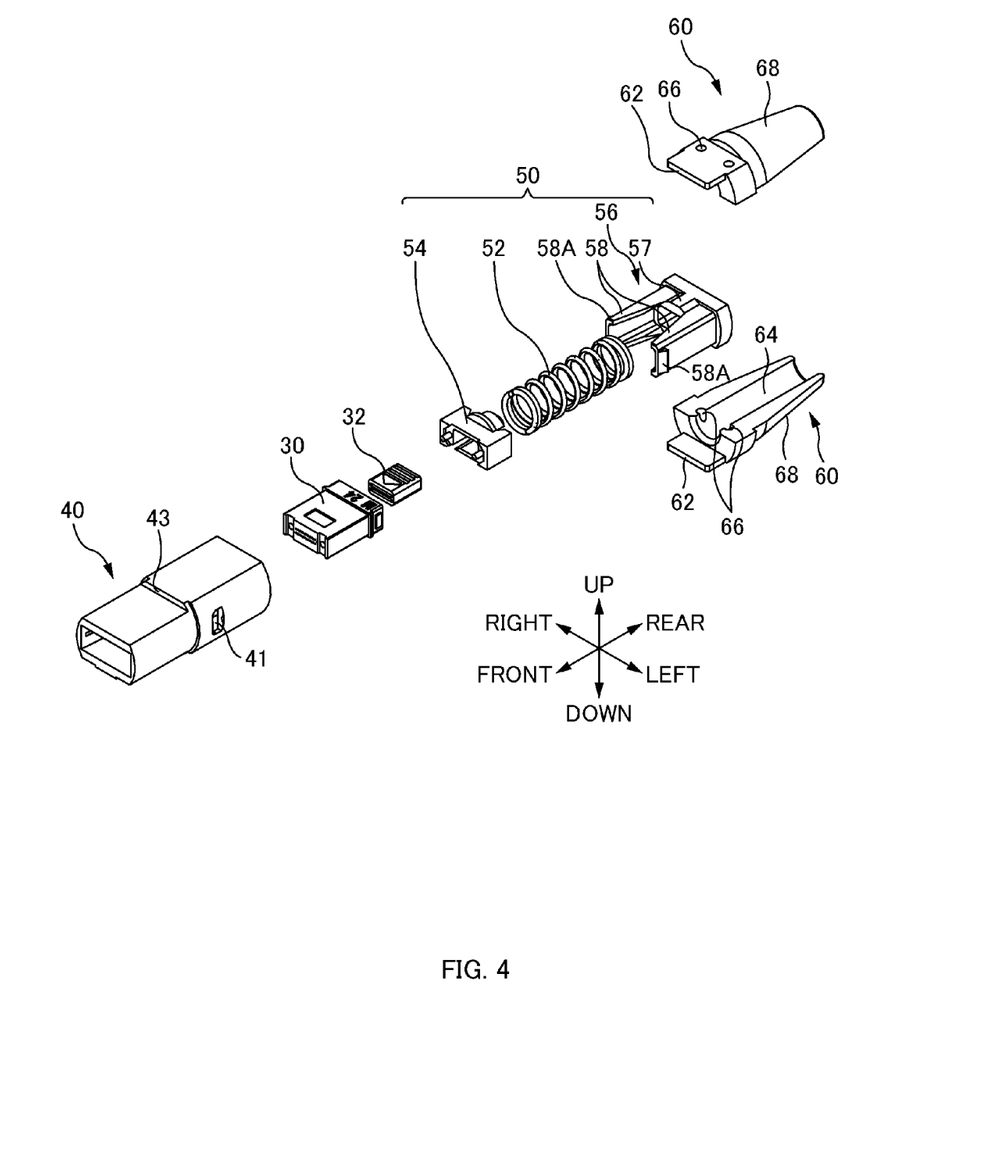
FIG. 4 is an exploded view of a floating mechanism 50 and a metal half member 60.

FIG. 3 is an exploded view of the plug-side optical connector 10. FIG. 4 is an exploded view of the floating mechanism 50 and a metal half member 60.

The plug-side optical connector 10 includes, in addition to the coupling device 20, the ferrule 30 and the housing 40, the floating mechanism 50 and the metal half member 60 (see FIG. 4). The plug-side optical connector 10 also includes a fastening device 70 on the rear side with respect to the floating mechanism 50 and the metal half member 60 (see FIG. 3). A boot 32, which protects optical fibers, is placed in the rear side of the ferrule 30 (see FIG. 4).

Floating Mechanism 50

The housing 40 accommodates the ferrule 30, which can move rearward with the floating mechanism 50. That is, the floating mechanism 50 is a mechanism with which the ferrule 30 is accommodated in the housing in such a manner that the ferrule can move rearward. The floating mechanism 50 includes: a coil spring 52; a catch 54; and an engaging member 56 (a spring push).

The coil spring 52 is placed being compressed between the catch 54 and the engaging member 56. By the reaction force of the compressed coil spring 52, the ferrule 30 is pushed forward through the catch 54. Through the central hollow of the coil spring 52, optical fibers (not shown) are passed.

The catch 54 is a member which affixes the end of the coil spring 52 to the ferrule 30. The front pins of the catch 54 are inserted in the rear openings of the guide holes 31 of the ferrule 30, and the catch 54 is thereby affixed to the ferrule 30. And, the front end of the coil spring 52 is inserted in the spring-fixing section which protrudes backwards of the catch 54, and the front end of the coil spring 52 is thereby affixed to the catch 54. Through the hole of the catch 54 penetrating in the front-rear direction, the optical fibers (not shown) are passed.

The engaging member 56 is a member which causes the coil spring 52 which remains compressed to be accommodated in the housing 40. The engaging member 56 is a U-shaped member including: a receiving section 57; and a pair of arm sections 58 which extends forward from both left and right sides of the receiving section 57 respectively. And, the rear end of the coil spring 52 is in contact with the receiving section 57. Through the hole of the receiving section 57 penetrating in the front-rear direction, optical fibers (not shown) are passed. In a space between the pair of arm sections 58, the coil spring 52 is accommodated. On the front end of each arm section 58, a claw section 58A is formed extending outwardly. The claw sections 58A are respectively hooked to window sections 41 on the sides of the housing 40, and the engaging member 56 engages the housing 40 under the reaction force of the coil spring 52.

Metal Half Member 60

The housing 40 is fixed to the inside of the coupling device 20 (the outer housing 23) while being sandwiched in the front-rear direction between the coupling device 20 (the outer housing 23) and the metal half member 60. And, the metal half member 60 is affixed to the coupling device 20 with metal pins 80. In other words, the metal half member 60 is a metal member which is affixed to the coupling device 20 while holding the housing 40 between itself and the coupling device 20.

The metal half members 60 are respectively the upper and lower metal members each of which is one of a two-part division. Each metal half member 60 includes: a housing holder 62; an optical-fiber passing section 64; two pin holes 66; and a tapered section 68.

The housing holder 62 is a portion which holds the housing between itself and the coupling device. The housing holder 62 is a plate-like portion which protrudes forward, and its front-end face is in contact with the rear-end face 44 of the housing through the engaging member 56. Between two of the plate-like housing holders 62, the receiving section 57 of the engaging member 56 is placed. The upper and lower housing holders 62 are restrained by the upper and lower surfaces of the housing accommodating section 24 of the outer housing 23 of the coupling device 20 (see FIG. 7), with the receiving section 57 of the engaging member 56 being sandwiched in the up-down direction between the housing holders 62.

The optical-fiber passing section 64, in which optical fibers (not shown) are placed, is a groove-like portion formed in the metal half member 60 along the front-rear direction. By mating the two metal half members 60, the optical-fiber passing sections 64 function as a through hole through which the optical fibers pass. The optical fibers are brought out of the optical cable, and then the optical fibers are placed in the optical-fiber passing sections 64 of the mated metal half members 60.

Each pin hole 66 is a hole into which the metal pin 80 are inserted. Two pin holes 23A which extend through in the up-down direction are formed on the rear side of the outer housing 23 of the coupling device 20. Through the pin holes 23A of the outer housing 23 and the pin holes 66 of the metal half members 60, each metal pin 80 is inserted while both ends of the metal pin 80 are placed at the pin holes 23A of the outer housing 23. In this way, the metal half members 60 are affixed to the coupling device 20 through the metal pin 80. Note that, the pin holes 66 of the metal half member 60 penetrate in the up-down direction, and one metal pin 80 is inserted into the pin holes 66 of two upper and lower metal half members 60 so as to penetrate them. In this way, the two metal half members 60 are affixed through the metal pins 80. The outside of the pin holes 23A of the outer housing 23 is covered with an outer fastening device 72 (see FIG. 3), and the metal pins 80 do not be removed from the pin holes 23A of the outer housing 23 and the pin holes 66 of the metal half members 60.

The metal pins 80 are arranged parallel in the up-down direction, which is perpendicular to the front-rear direction (direction of attaching/detaching). In other words, the metal half members 60 and the outer housing 23 of the coupling device 20 are fixed by the metal pins 80, which are arranged parallel in the up-down direction. When attaching/detaching the optical connector, force in the front-rear direction (direction of attaching/detaching) is applied to portions to which the metal half members 60 and the outer housing 23 of the coupling device 20 are affixed. The metal pins 80 are therefore arranged perpendicular to a force in the direction of attaching/detaching, and durability is thereby improved.

The tapered section 68 is a section including a tapered surface, the shape of which becomes narrower towards the rear. The tapered section 68 is a section on the rear side of the metal half member 60, and is located inside the fastening device 70. The jacket of an optical cable is split when bringing out optical fibers from the optical cable, and then the split jacket is placed covering the outside of the tapered section 68 of the metal half member 60 (see FIG. 8D).

Fastening Device 70

The fastening device 70 is a device which affixes the optical connector 10 to an end of an optical cable. The fastening device 70 includes: the outer fastening device 72; and an inner fastening device 74 (see FIG. 3).

In the outer fastening device 72, female screws are formed. And, male screws are formed on the outer surface of the rear end section of the outer housing 23 of the coupling device 20 (not shown in FIG. 3 for omitting screw threads), these male screws mate with the female screws of the outer fastening device 72.

The inner fastening device 74 is a cylindrical metal member inside the outer fastening device 72. When the outer fastening device 72 is fastened, the inner fastening device 74 moves forward together with the outer fastening device 72. The outer fastening device 72 and the coupling device 20 are joined by screwing, the jacket of the optical cable is maintained to be sandwiched between the tapered section 68 of the metal half member 60 and the inner surface of the inner fastening device 74. The rear part of the optical connector 10 is thereby fixed to an end of the optical cable.

As mentioned above, the coupling device 20 (the outer housing 23) is affixed by the fastening device 70 and the metal half member 60. That is, the coupling device 20 (the outer housing 23) is affixed by metal parts. Thus, even if the coupling device 20 is subject to force when attaching/detaching the optical connector 10, the force can be supported by the metal parts and high durability can be realized.

Housing 40

Figure 5A:
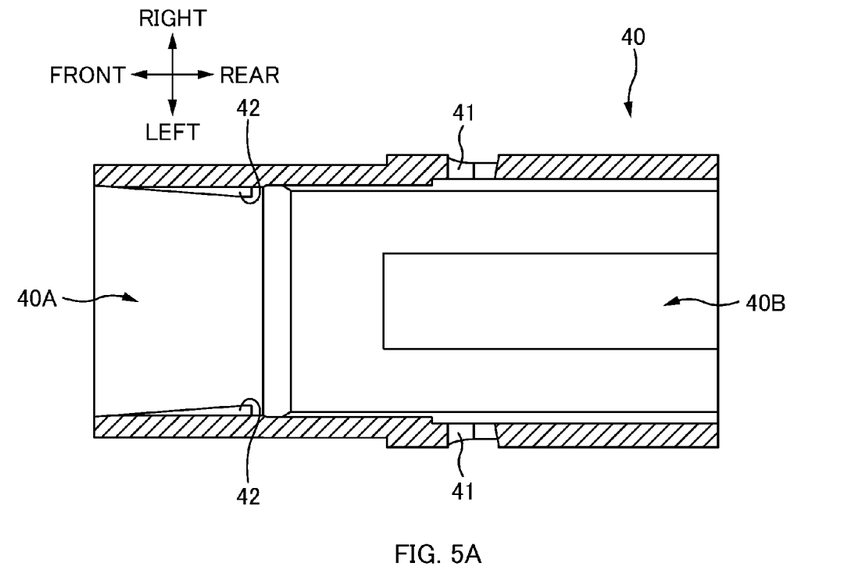
FIGS. 5A and 5B are cross-sectional views of a housing 40.
Figure 5B:
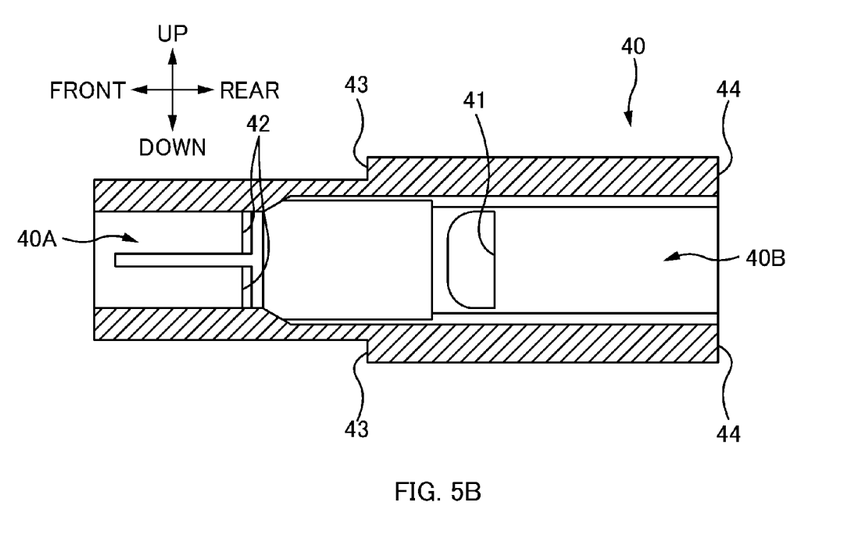
Figure 6A:
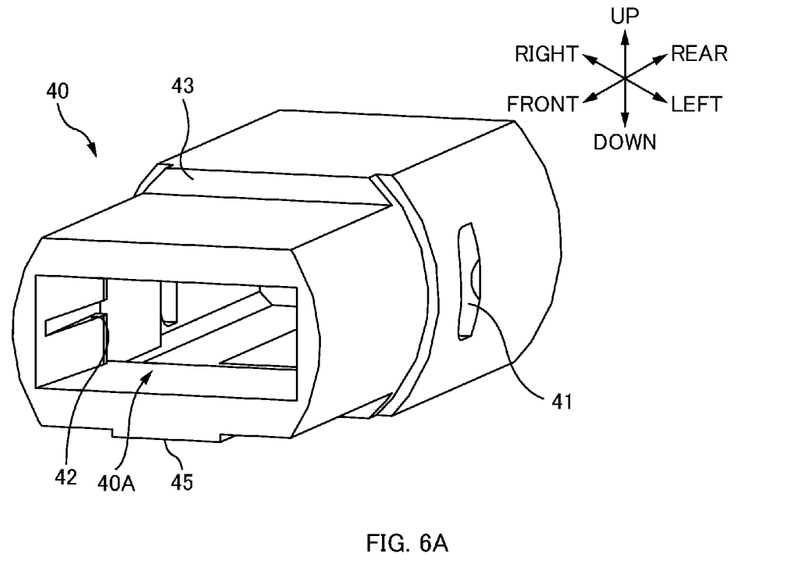
FIGS. 6A and 6B are perspective views of the housing 40.
Figure 6B:
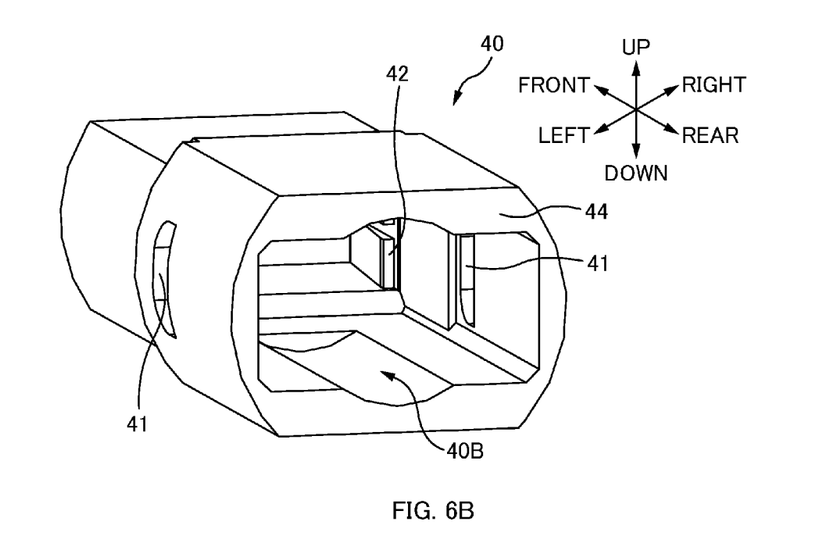

FIGS. 5A and 5B are cross-sectional views of the housing 40. FIGS. 6A and 6B are perspective views of the housing 40.

The housing 40 is a member (an inner housing) which accommodates the ferrule 30 in such a manner that the ferrule can move rearward and which is accommodated by the coupling device 20 (the outer housing 23). Inside the housing 40, a ferrule accommodating section 40A and a spring accommodating section 40B are formed.

The ferrule accommodating section 40A is an accommodating section (accommodating space) which accommodates the ferrule 30, and is formed in the front side of the housing 40. The front part of the ferrule accommodating section 40A has an opening, and the end face of the ferrule 30 protrudes from the opening. On the side walls of the ferrule accommodating section 40A, protrusions 42 are formed, and the ferrule 30 is pushed forward by the reaction force of the coil spring 52 of the floating mechanism 50 while the flange of the ferrule 30 engaging the foregoing protrusions 42.

The spring accommodating section 40B is an accommodating section (accommodating space) which accommodates the floating mechanism 50, which includes the coil spring 52, the catch 54 and the engaging member 56. And, the spring accommodating section 40B is formed in the rear side of the housing 40. The rear part of the ferrule accommodating section 40A has an opening, and the receiving section 57 of the engaging member 56 protrudes from the opening. The window sections 41 are formed on the side walls of the spring accommodating section 40B, and the claw sections 58A of the arm sections 58 of the engaging member 56 are respectively hooked to the window section 41.

Figure 7:
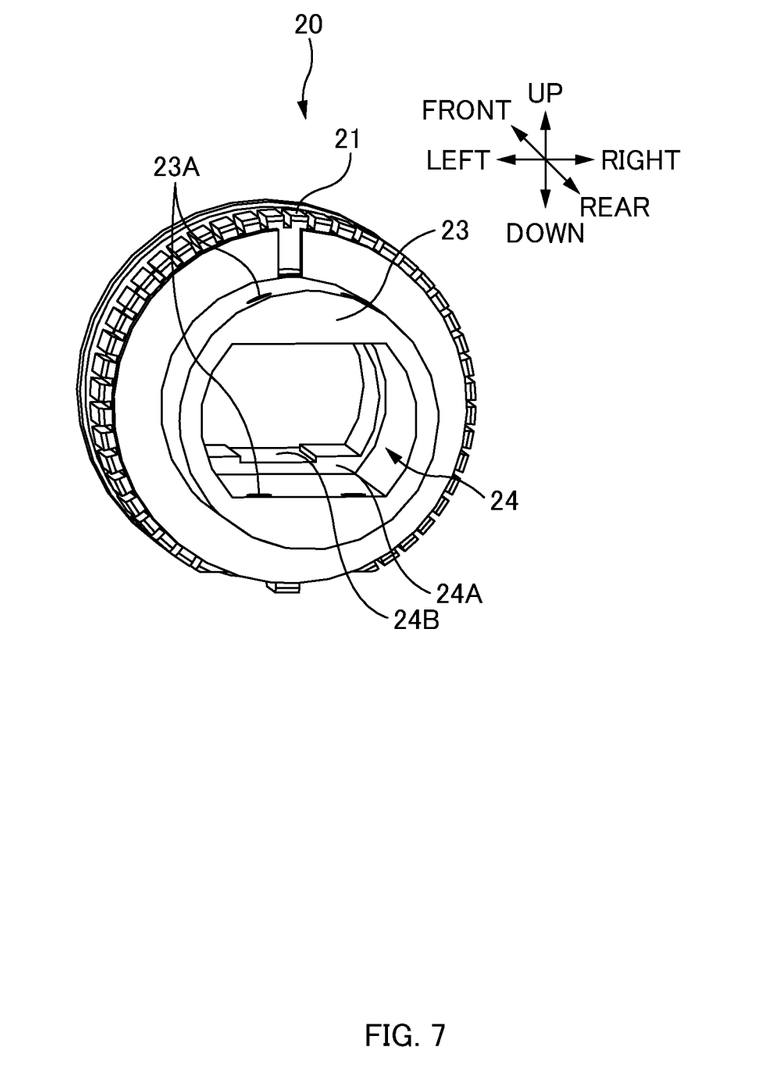
FIG. 7 is a perspective view showing a housing accommodating section 24 of an outer housing 23 of a coupling device 20.

Contact surfaces 43 are formed outside of the housing 40. The contact surfaces 43 are each a surface which faces forward (a surface whose normal vector extends forward). As shown in FIG. 7, in the housing accommodating section 24 of the outer housing 23 of the coupling device 20, an alignment surface 24A protruding from inner walls are formed. The alignment surface 24A faces rearward. This alignment surface 24A is in contact with the contact surfaces 43 of the housing 40, the front part of the housing 40 is thereby positioned with respect to the outer housing 23. The rear-end face 44 of the housing 40 is in contact with the front-end face of the housing holder 62 of the metal half member 60. Since the metal half member 60 is affixed to the coupling device 20, the housing 40 is fixed to the inside of the outer housing 23 of the coupling device 20 while being sandwiched in the front-rear direction between the alignment surface 24A of the outer housing 23 and the housing holder 62 of the metal half member 60. Since the contact surface 43 is in contact with the alignment surface 24A, the contact surface 43 will not collide with the alignment surface 24A even if the optical connector is repeatedly attached/detached. Thus, the contact surface 43 of the housing 40 made of resin is less likely to wear.

An alignment key 45 is formed on the lower surface in the front side of the housing 40 (in the front side with respect to the contact surface 43). As shown in FIG. 7, a keyway 24B is formed on the inner surface of the housing accommodating section 24 of the outer housing 23 of the coupling device 20. By mating the keyway 24B with the alignment key 45 of the housing 40, the housing 40 and the coupling device 20 are aligned to each other.

The housing 40 is made of resin. Specifically, the housing 40 is made of PBT resin (polybutyleneterephthalate). The ferrule 30 is also made of resin. Specifically, the ferrule 30 is made of PPS resin (polyphenylene sulfide). The Young's modulus of the ferrule 30 is therefore closer to the Young's modulus of the housing 40 than to the Young's modulus of the coupling device 20 made of metal (SUS: stainless steel). Specifically, the Young's modulus of the ferrule 30 is 3.96 kN/mm$^2$, the Young's modulus of the housing 40 is 2.4 kN/mm$^2$, and the Young's modulus of the coupling device 20 is 193 kN/mm$^2$.

Here, suppose that the housing 40 is a metal housing and that the ferrule 30 is accommodated by the metal housing in such a manner that the ferrule can move rearward. In this case, a portion of the ferrule 30 which is in contact with the metal housing (e.g., flange) is subject to force directly from the metal housing when attaching/detaching the optical connector 10, and the difference in Young's modulus between the metal housing and the ferrule is large. Consequently, the ferrule 30 is likely to wear, the durability of the optical connector deteriorates (the allowable number of attaching/detaching of the optical connector decreases).

As opposed thereto, in the present embodiment, since the housing 40 is made of resin, the difference between the Young's modulus of the housing 40 and the Young's modulus of the ferrule 30 is smaller than the difference between the Young's modulus of the coupling device 20 (the outer housing 23) and the Young's modulus of the ferrule 30. This makes it possible to reduce load which the flange of the ferrule 30 is subject to, which is in contact with the housing 40. And, this also makes it possible to improve the durability of the optical connector.

Method for Assembling Optical Connector 10

FIGS. 8A to 8E are explanatory diagrams showing a method for assembling the plug-side optical connector 10.

Figure 8A:
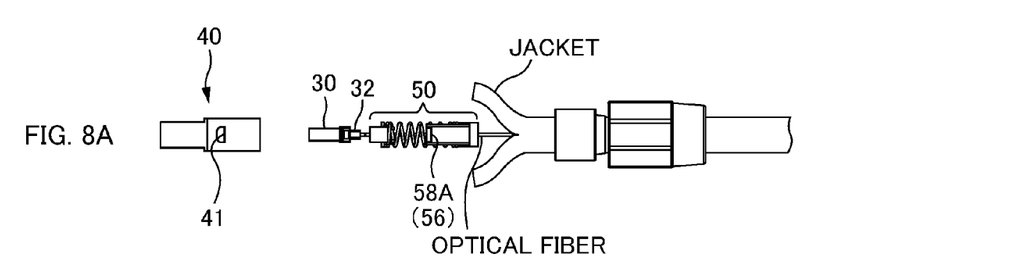
FIGS. 8A to 8E are explanatory diagrams showing a method for assembling the plug-side optical connector 10.

First, an operator passes in advance an optical cable through the fastening device 70 (the outer fastening device 72 and the inner fastening device 74), and then optical fibers are brought out of the optical cable. At this stage, the operator splits the jacket of the optical cable, and bring out the optical fibers of the optical cable. As shown in FIG. 8A, the operator passes in advance the optical fibers through the floating mechanism 50 and the boot 32, and then attaches the ferrule 30 (and the boot 32) to the ends of the optical fibers. And, the operator fixes the ends of the optical fibers to the ferrule 30 with adhesion.

Next, as shown in FIG. 8A, the operator inserts the ferrule 30 and the floating mechanism 50 from the rear side of the housing 40. If the claw section 58A of the engaging member 56 of the floating mechanism 50 is hooked to the window section 41 of the housing 40, the ferrule 30 is accommodated inside the housing 40 in such a manner that the ferrule can move rearward with the floating mechanism 50.

Figure 8B:
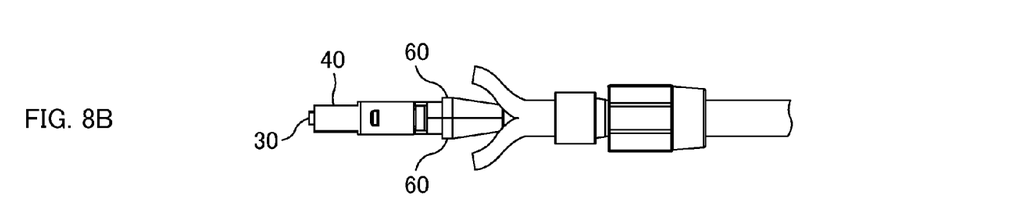

Next, as shown in FIG. 8B, the operator attaches the metal half members 60 from above and below. Since the metal half members 60 are respectively upper and lower members of a two-part division, an optical cable and optical fibers do not have to passes in advance through the metal half members 60. Thus, the metal half members 60 are easy to attach. The operator places the metal half members 60 so that the front-end face of the housing holder 62 of the metal half member 60 is in contact with the rear-end face 44 of the housing 40 through the receiving section 57 of the engaging member 56. Also, the operator places the split jacket of the optical cable so that the jacket covers the outside of the tapered section 68 of the metal half member 60. Also, the operator cuts a fiber member such as Kevlar of the optical cable to a comparable length to the jacket, and places the fiber member so that the fiber member covers the outside of the tapered section 68 of the metal half member 60.

Figure 8C:
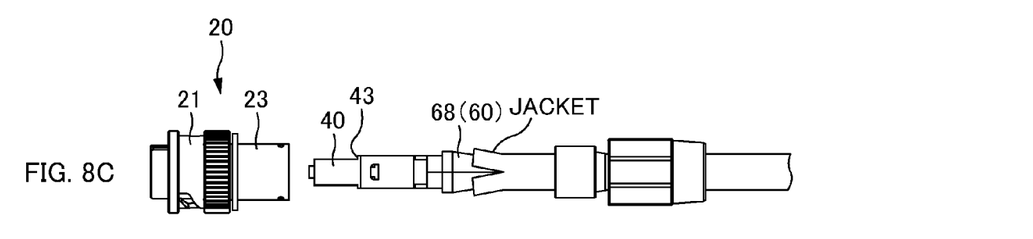

Next, as shown in FIG. 8C, the operator insert the housing 40 and the like from the rear side the coupling device. Then, while mating the alignment key 45 of the housing 40 with the keyway 24B of the housing accommodating section 24 the outer housing 23 of the coupling device 20, the operator inserts the housing 40 and the like from the rear side of the outer housing 23. The housing 40 and the coupling device 20 are thereby aligned to each other. Also, the operator inserts the housing holders 62 of the upper and lower metal half members 60 into the spring accommodating section 40B in the outer housing 23 of the coupling device 20 (see FIG. 7) while sandwiching the receiving section 57 of the engaging member 56 between these two housing holders 62 in the up-down direction. Then, since the housing holders 62 of the metal half members 60 are guided by the upper and lower surfaces of the spring accommodating section 40B, the housing 40 and the like become less likely to shift with respect to the outer housing 23 in the direction of rotation (in the direction of rotation about the front-rear direction).

When inserting the housing 40 into the outer housing 23, the contact surface 43 of the housing 40 comes into contact with the alignment surface 24A of the housing accommodating section 24 of the outer housing 23 (see FIG. 7), and then the housing 40 is positioned with respect to the outer housing 23. Then, the upper and lower housing holders 62 are restrained by the upper and lower surfaces of the spring accommodating section 40B (see FIG. 7), and therefore the metal half member 60 becomes less likely to be misaligned. Also, the pin hole 23A of the outer housing 23 and the pin hole 66 of the metal half member 60 are aligned in the up-down direction.

Figure 8D:
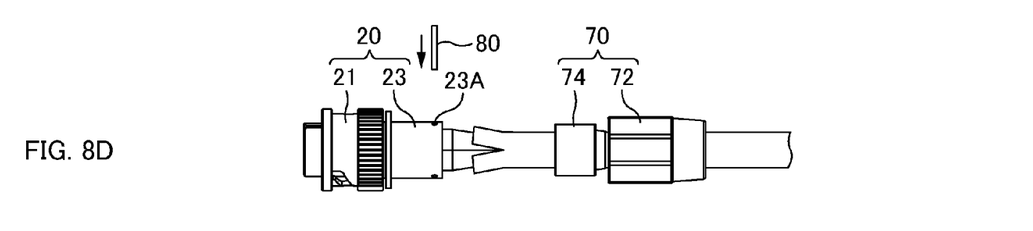

Next, as shown in FIG. 8D, the operator inserts metal pins 80 into the pin holes 23A of the outer housing 23 of the coupling device 20 and the pin holes 66 of the metal half member 60. The coupling device 20 and the metal half member 60 are therefore affixed with the metal pins 80. And, the housing 40 is fixed to the inside of the coupling device while being sandwiched in the front-rear direction between the housing holder 62 of the metal half member 60 and the alignment surface 24A of the housing accommodating section 24 of the outer housing 23 of the coupling device 20.

Figure 8E:
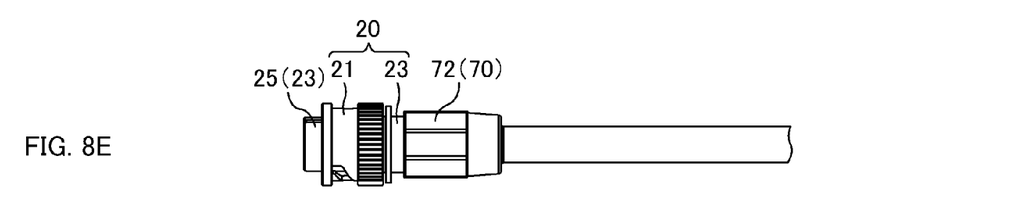

Finally, as shown in FIG. 8E, the operator fastens the outer fastening device 72, and thereby the male screws on the outer surface of the rear end section of the coupling device 20 (not shown in FIG. 3 for omitting screw threads) mate with the female screws of the outer fastening device 72. When the outer fastening device 72 is fastened, the inner fastening device 74 moves forward together with the outer fastening device 72. When the inner fastening device 74 moves forward, the jacket of the optical cable (fiber member such as Kevlar) is sandwiched between the tapered section 68 of the metal half member 60 and the inner surface of the inner fastening device 74. The rear part of the optical connector 10 is thereby affixed to an end of the optical cable.

Figure 9:
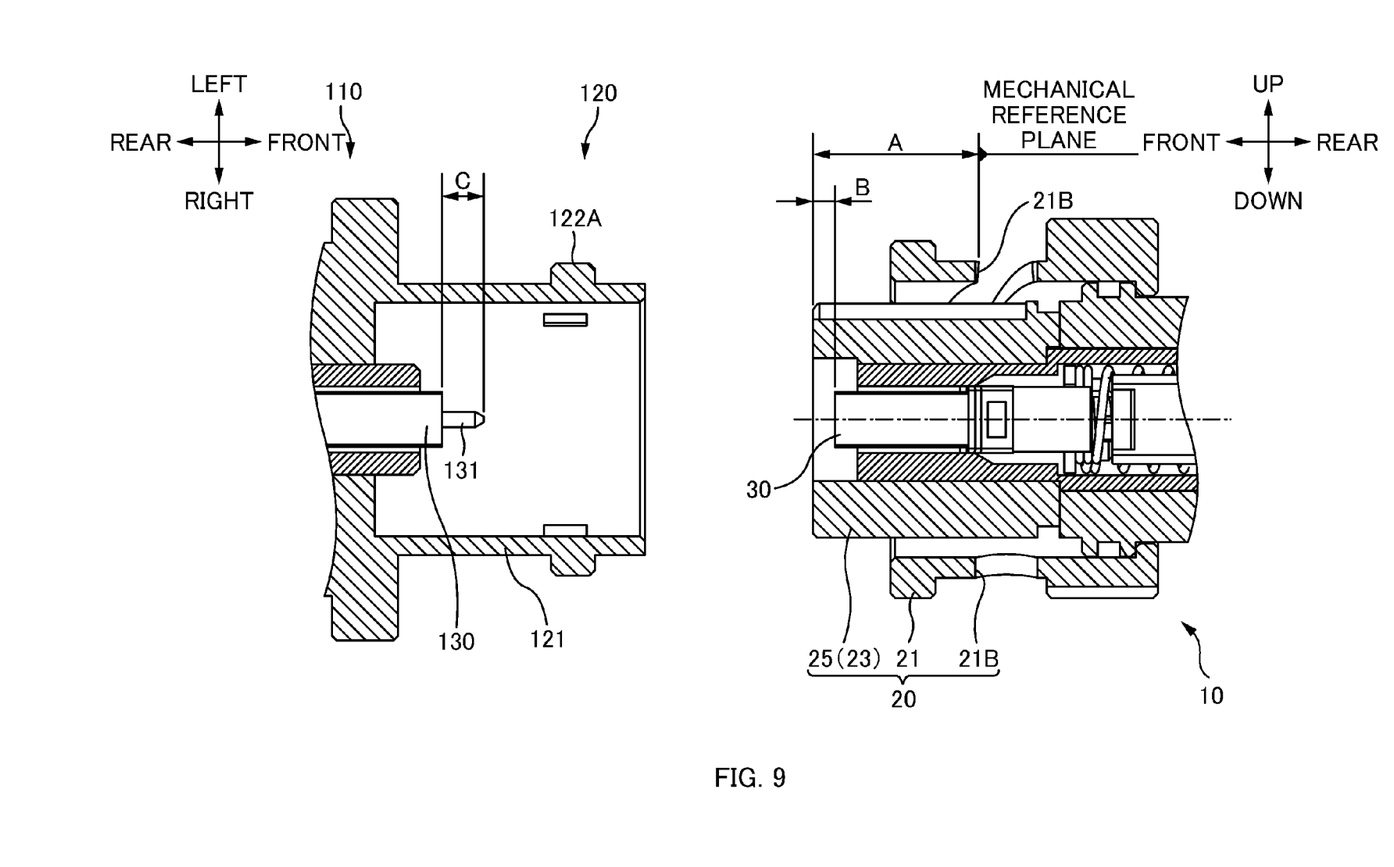
FIG. 9 is a cross-sectional view showing the positional relationship between a mechanical reference plane and the front edge of the outer housing.

Positional Relationship Between Mechanical Reference Plane and Front Edge of Outer Housing FIG. 9 is a cross-sectional view showing the positional relationship between the mechanical reference plane and the front edge of the outer housing.

The mechanical reference plane (reference position) of the plug-side optical connector is defined as a position where the coupling device of the receptacle-side optical connector hooks. In the present embodiment, since the outer projection 122A of the receptacle-side coupling device 120 is hooked to the anchor section 21B of the rotation section 21 of the plug-side coupling device 20, the position of the anchor section 21B is the position of the mechanical reference plane. More strictly speaking, since the ferrules 30 and 130 are, while being pushed forward, accommodated in such a manner that the ferrule can move rearward, the reaction force of meeting the end faces of the ferrules 30 and 130 causes the rear edge of the receptacle-side outer projection 122A to be hooked to the front edge of the plug-side anchor section 21B. Thus, the position of a side surface of the anchor section 21B on the front is specified as a mechanical reference plane. The position of this mechanical reference plane is shown in the figure.

As shown in FIG. 9, the distance in the front-rear direction from the mechanical reference plane to the front edge of the outer housing 23 (the front edge of the inserted section 25) is defined as A (mm). As shown in the drawings, the distance in the front-rear direction from the front edge of the outer housing 23 (the front edge of the inserted section 25) to the end face of the ferrule 30 (the position of the opening of a guide hole 31) is defined as B (mm), and the distance the guide pin 131 protrudes from the end face of the receptacle-side ferrule 130 is defined as C (mm). Specifically, A=7.3 mm, B=1.0 mm, and C=1.6 mm herein.

Further, the ferrules 30 and 130 move rearward when connecting the optical connectors, and the total amount of these movements of both ferrules 30 and 130 is defined as X (mm). Specifically, X=1.4 mm herein.

Incidentally, when the guide pin 131 is inserted into the guide hole 31 which is not aligned to the guide pin 131, the surrounding area of the guide hole 31 is subject to a large force. If the optical connector is repeatedly attached/detached under such a condition, the surrounding area of the guide hole 31 wears. Consequently, the ferrules 30 and 130 are misaligned, and transmission loss increases. It is therefore desirable that the central axis of the guide pin 131 and the central axis of the guide hole 31 have been well-aligned immediately before the guide pin 131 is inserted into the guide hole 31.

In order to reduce misalignment between the central axis of the guide pin 131 and the central axis of the guide hole 31, it is preferable to elongate the distance the inserted section 25 of the plug-side coupling device 20 is inserted into the receptacle-side main body 121 until the guide pin 131 reaches to the guide hole 31. In other words, it is preferable to elongate the distance the inserted section 25 is guided by the main body 121 until the guide pin 131 reaches to the guide hole 31. Hereinbelow, the distance the inserted section 25 is guided by the main body 121 until the guide pin 131 reaches to the guide hole 31 is sometimes referred to as "guiding distance". The guiding distance L is represented as follows.

$$L=A+B-C+X$$

The value C and the value X are values prescribed by standard. In addition, since the optical reference plane with respect to the mechanical reference plane (the ferrule end face when connecting the optical connectors) is prescribed by standard, the value of A−B is a prescribed value. That is, the parameter which determines the guiding distance L is substantially the value A.

Then, two types of the optical connectors, whose distances A are 5.0 mm and 7.0 mm respectively, have been prepared, and durability tests have been conducted for each optical connector. In the durability tests, coupling loss has been measured whenever the optical connector is attached/detached 100 times.

Figure 10A:
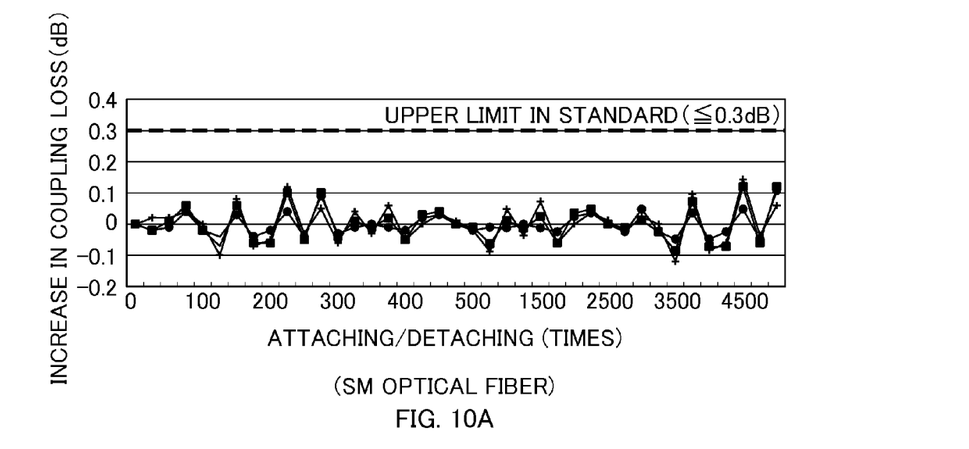
FIGS. 10A and 10B are graphs of coupling loss to the number of attaching/detaching when the distance A=7.0 mm.
Figure 10B:
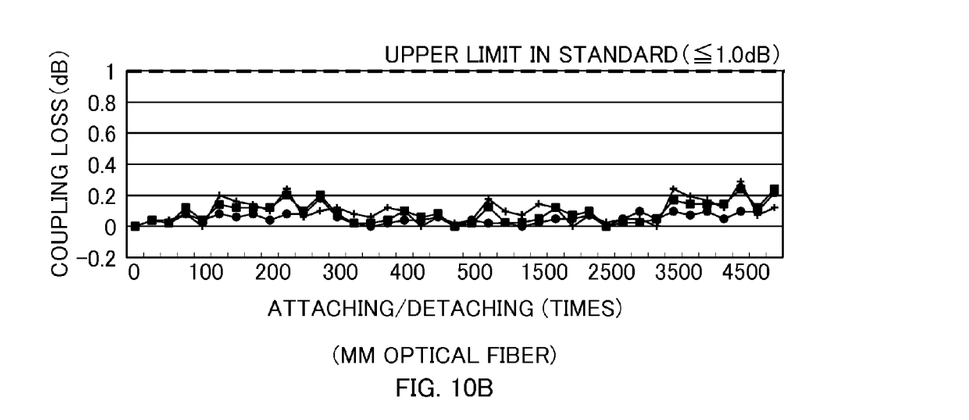

FIGS. 10A and 10B are graphs of coupling loss for the number of times that an optical connector is attached/detached when the distance A=7.0 mm. FIG. 10A is a graph in the case of a single-mode optical fiber, and FIG. 10B is a graph in the case of a multi-mode optical fiber. In the case of the single-mode optical fiber, the allowable number of attaching/detaching is the number of attaching/detaching in which the increase in coupling loss is 0.3 dB or less (the upper limit in the standard). In the case of the multi-mode optical fiber, the allowable number of attaching/detaching is the number of attaching/detaching in which the coupling loss is 1.0 dB or less (the upper limit in the standard).

When the distance A=5.0 mm, the allowable number of attaching/detaching is approximately 500 times. This is substantially as large as the allowable number of attaching/detaching of a well-known MPO connector which is not intended for frequent attaching/detaching.

As opposed thereto, when the distance A=7.0 mm and the number of attaching/detaching reaches 5000 times, the coupling loss is equal to or less than the upper limit in the standard, and the deterioration of optical properties has not been observed. That is, when the distance A=7.0 mm, the allowable number of attaching/detaching is 5000 or more times (10 or more times the allowable number of attaching/detaching of an MPO connector), and the allowable number of attaching/detaching increases dramatically. As for the reason why the dramatical increase of the allowable number of attaching/detaching, it can be considered that, since the guiding distance L in the case of the distance A=7.0 mm is longer than that in the case of the distance A=5.0 mm, misalignment between the central axis of the guide pin 131 and the central axis of the guide hole 31 is reduced immediately before the guide pin 131 is inserted into the guide hole 31, and therefore the surrounding area of the guide hole 31 is less worn even if the optical connector is repeatedly attached/detached.

As the distance A becomes longer, the guiding distance L becomes longer and the allowable number of attaching/detaching increases. In order to achieve the allowable number of attaching/detaching of 5000 times or more, it is therefore desirable that the distance A (mm) from the mechanical reference plane to the front edge of the outer housing 23 (the front edge of the inserted section 25) is 7.0 mm or more.

Figure 11A:
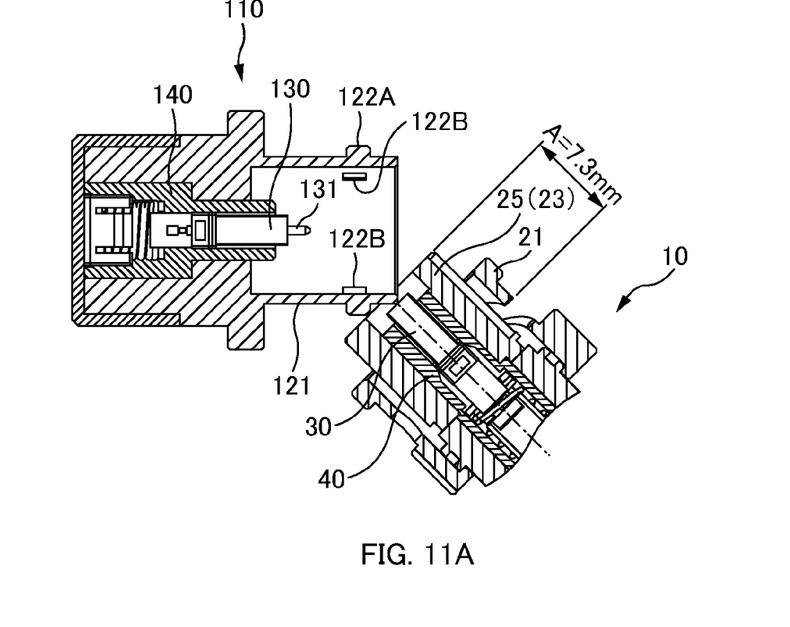
FIG. 11A is an explanatory diagram of the optical connector 10 when the distance A=7.3 mm.

FIG. 11A is an explanatory diagram of the optical connector 10 when the distance A=7.3 mm. When the distance A=7.3 mm, the distance B from the front edge of the outer housing 23 to the end face of the ferrule 30 is 1 mm. In this case, as shown in the figures, when the plug-side optical connector 10 approaches obliquely towards the receptacle-side optical connector 110, it is possible that the front edge of the receptacle-side main body 121 comes into contact with the end face of the plug-side ferrule 30 to damage the ferrule 30.

Figure 11B:
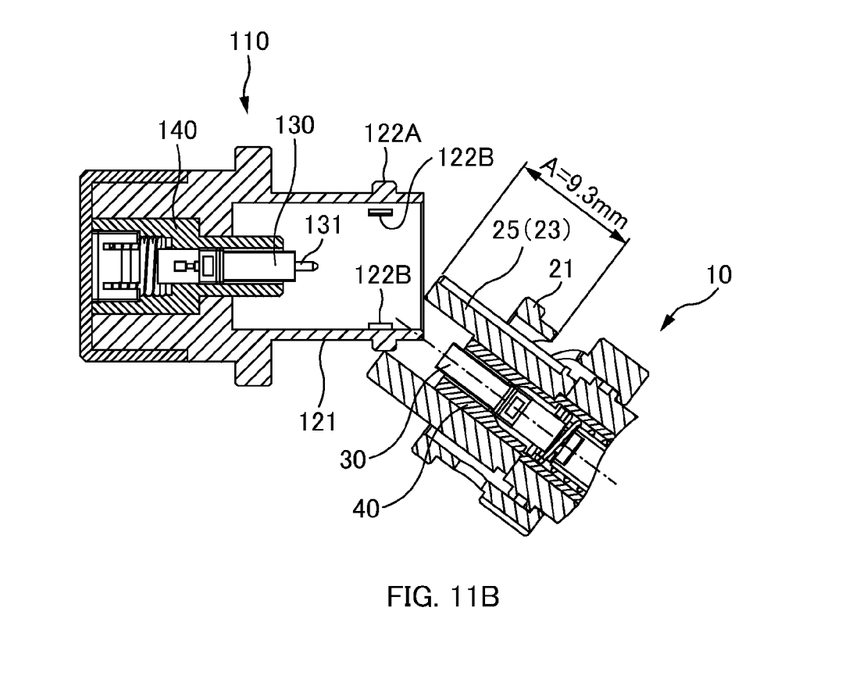
FIG. 11B is an explanatory diagram of the optical connector 10 when the distance A=9.3 mm.

FIG. 11B is an explanatory diagram of the optical connector 10 when the distance A=9.3 mm. As the distance A becomes longer, the distance B from the front edge of the outer housing 23 to the end face of the ferrule 30 becomes longer (as mentioned above, A−B is a constant). The distance B becomes longer, and the front edge of the receptacle-side main body 121 becomes less likely to be in contact with the end face of the plug-side ferrule 30. When the distance A=9.3 mm, the distance B from the front edge of the outer housing 23 to the end face of the ferrule 30 is longer than that in the case of FIG. 11A, the front edge of the receptacle-side main body 121 will not come into contact with the end face of the plug-side ferrule 30 no matter how the plug-side optical connector 10 is inclined with respect to the receptacle-side optical connector 110. It is desirable that, as mentioned above, the distance A is determined so that the front edge of the receptacle-side main body 121 will not come into contact with the end face of the plug-side ferrule 30 no matter how the plug-side optical connector 10 is inclined with respect to the receptacle-side optical connector 110.

In the optical connectors 10 shown in FIGS. 11A and 11B, since the distance A from the mechanical reference plane to the front edge of the outer housing 23 is 7 mm or more, the allowable numbers of attaching/detaching these optical connectors 10 is more than 5000 times.

Others

The above-described embodiment is merely for facilitating the understanding of the invention, but is not meant to be interpreted in a manner limiting the scope of the invention. The invention can of course be altered and improved as in the following description, for example, without departing from the gist thereof and includes functional equivalents.

Metal Half Member 60

In the foregoing embodiments, the two metal half members 60 are affixed to the coupling device 20 while holding the housing 40 between the metal half members 60 and the coupling device 20 (the outer housing 23). However, a metal member which is affixed to the coupling device 20 while holding the housing 40 between itself and the coupling device 23 does not have to be either of upper or lower one of a two-part division. Such a metal member may be, for example, a metal cylindrical member including a hole which fibers pass through. But, if a metal member is one of a two-part division as described in foregoing embodiments is useful when the optical connector is assembled.

Metal Pin 80

In the foregoing embodiments, by the metal pin 80, the coupling device 20 (the outer housing 23) and the metal half member 60 are affixed. However, a method for affixing the coupling device 20 and the metal half member 60 is not limited thereto. The coupling device 20 and the metal half member 60 may be directly affixed by the following means: forming an engaging section (e.g., claw section) on the coupling device 20; forming an anchor section on the metal half member 60; and hooking the engaging section of the coupling device 20 to the anchor section of the metal half member 60.

What is claimed is:

1. A plug-side optical connector, comprising:
   a plug-side coupling device made of metal
      that is to be coupled to a coupling device made of metal of another optical connector,
         the other optical connector being on receptacle side, being for being coupled with the plug-side optical connector, and including a cylindrical main body and an outer projection which protrudes outwardly from the outer surface of the main body,
      the plug-side coupling device including
         an outer housing which has an inserted section being inserted into the cylindrical main body of the coupling device on the receptacle side and
         a cylindrical rotation section which includes a reference section to which the outer projection is to be hooked, which is rotatable outside the outer housing, and which is placed outside of the main body when the inserted section is inserted; and
      a ferrule that is accommodated inside the inserted section, wherein
      when a direction in which the optical connector is attached or detached is defined as a front-rear direction and a side of the receptacle-side optical connector is defined as front,
      the ferrule has a guide hole or a guide pin which the guide pin or the guide pin or the guide hole of the receptacle-side ferrule are fitted, and which a central axis of the guide hole and a central axis of the guide pin are along the front-rear direction;
      a distance in the front-rear direction from the reference section to a front edge of the inserted section is 7.0 mm or more; and
      an allowable number of attaching/detaching is 5000 or more times in which the increase in coupling loss is 0.3 dB or less in the case of the single-mode optical fiber, or in which the coupling loss is 1.0 dB or less in the case of the multi-mode optical fiber.

2. A plug-side optical connector according to claim 1, wherein
   the distance in the front-rear direction from the reference section to the front edge of the inserted section is determined so that the main body on the receptacle side does not come into contact with an end face of the ferrule no matter how the plug-side optical connector is inclined with respect to the receptacle-side optical connector.

3. A plug-side optical connector according to claim 1, wherein
   the ferrule is, while being pushed forward, accommodated in such a manner that the ferrule can move rearward,
   the coupling mechanism includes an anchor section to which a projection of the coupling mechanism on the receptacle side is to be hooked, and
   the reference section is a front surface of the anchor section.

4. A plug-side optical connector according to claim 1, wherein
   the plug-side coupling mechanism is a metal coupling device, and
   the plug-side optical connector further includes:
   a housing which is made of resin and which is accommodated by the coupling device while accommodating the ferrule in such a manner that the ferrule can move rearward; and
   a metal member which is affixed to the coupling device while holding the housing between the metal member and the coupling device.

5. A plug-side optical connector according to claim 4, wherein
   a difference between a Young's modulus of the housing and a Young's modulus of the ferrule is smaller than a difference between a Young's modulus of the coupling device and the Young's modulus of the ferrule.

* * * * *